United States Patent
Redi

(10) Patent No.: US 6,512,935 B1
(45) Date of Patent: Jan. 28, 2003

(54) ENERGY CONSERVING NETWORK PROTOCOL

(75) Inventor: Jason Keith Redi, Somerville, MA (US)

(73) Assignee: GTE Internetworking Incorporated, Burlington, MA (US)

(*) Notice: Subject to any disclaimer, the term of this patent is extended or adjusted under 35 U.S.C. 154(b) by 0 days.

(21) Appl. No.: 09/535,280

(22) Filed: Mar. 24, 2000

(51) Int. Cl.$^7$ .................... H04B 1/38; G01R 31/08
(52) U.S. Cl. .............. 455/574; 455/435; 455/441; 370/252
(58) Field of Search .................. 455/574, 69, 70, 455/67.1, 425, 456, 522, 466, 436, 441, 453, 435; 370/252, 465, 468

(56) References Cited

U.S. PATENT DOCUMENTS

| | | | | |
|---|---|---|---|---|
| 5,355,511 A | * | 10/1994 | Hatano et al. | 455/11.1 |
| 5,379,451 A | * | 1/1995 | Nakagoshi et al. | 455/435 |
| 5,467,341 A | * | 11/1995 | Matsukane et al. | 370/253 |
| 5,778,030 A | * | 7/1998 | Bruckert et al. | 375/317 |
| 5,787,348 A | * | 7/1998 | Willey et al. | 342/104 |
| 5,850,592 A | | 12/1998 | Ramanathan | 455/7 |
| 5,912,921 A | * | 6/1999 | Warren et al. | 370/332 |
| 5,950,132 A | * | 9/1999 | Armbruster et al. | 455/432 |
| 5,953,677 A | * | 9/1999 | Sato | 455/574 |
| 5,987,011 A | * | 11/1999 | Toh | 370/331 |
| 5,995,496 A | * | 11/1999 | Honkasalo et al. | 370/318 |
| 6,108,532 A | * | 8/2000 | Matsuda et al. | 455/413 |
| 6,115,580 A | * | 9/2000 | Chuprun et al. | 455/1 |
| 6,122,293 A | * | 9/2000 | Frodigh et al. | 370/473 |
| 6,134,230 A | * | 10/2000 | Olofsson et al. | 370/337 |
| 6,141,570 A | * | 10/2000 | O'Neill et al. | 455/574 |
| 6,192,230 B1 | * | 2/2001 | van Bokhorst et al. | 455/343 |
| 6,212,381 B1 | * | 4/2001 | Oda | 455/441 |
| 6,259,919 B1 | * | 7/2001 | Sounvieri et al. | 455/441 |
| 6,330,446 B1 | * | 12/2001 | Mori | 455/432 |

FOREIGN PATENT DOCUMENTS

| | | | |
|---|---|---|---|
| GB | 2305825 | * | 4/1997 |
| JP | 4110215053 | * | 8/1999 |

OTHER PUBLICATIONS

Young–woonget al, "A Novel Adaptive Routing Scheme for the QoS–Based Multimedia Services in Mobile Ad–Hoc Networks", Vehicular Technology Conference, Sep., 1999, IEEE vol. 1, pp. 396–400.*

Joa–Ng et al, "A Peer–to–Peer Zone–Based Two–Level Link State Routing for Mobile Ad Hoc Networks", Selected Areas in Communications, Aug., 1999, IEEE Journal, pp. 1415–1425.*

Xiaoyan et al, "Scalable Routing Protocols for Mobile Ad Hoc Networks", Jul.–Aug. 2002, IEEE Network, vol. 16, Issue 4, pp. 11–21.*

Briesemeister et al, "Role–Based Multicast in highly Mobile but Sparsely Connected Ad Hoc Networks", First Annual Workshop on Mobile and Ad Hoc Networking and Computing, Aug., 2000, pp. 45–50.*

* cited by examiner

*Primary Examiner*—Charles Appiah
(74) *Attorney, Agent, or Firm*—Leonard Charles Suchyta; James K. Weixel

(57) ABSTRACT

According to the principles of the invention, there is provided a system, apparatus, and method for conserving energy in a mobile station (100) of an ad hoc wireless data network (10). Information concerning motion of the mobile station is obtained, and a rate of motion is used to adjust network parameters such as a beaconing rate (202) and a link change granularity (216). These parameters may be adjusted to reduce network overhead transmissions, and the power usage associated therewith, at appropriate times. In one embodiment, network-related transmissions, such as beacon signals and link state announcements, are reduced when the mobile station is moving quickly.

21 Claims, 4 Drawing Sheets

ENERGY CONSERVING NETWORK PROTOCOL

BACKGROUND OF THE INVENTION

1. Field of the Invention

This application relates to the field of wireless data communication networks, and more particularly to the field of energy conservation in such wireless networks.

2. Description of Related Art

An ad hoc network is one in which all of the communicating stations organize themselves into a single communications fabric. The network adapts to changes such as movement of stations, destruction of stations, addition of new stations, signal interference, and the like. Ad hoc network techniques, such as packet radio, actually pre-date more generally known data networks such as the Internet. However, current ad hoc networks are typically designed to carry Internet Protocol ("IP") traffic.

Network protocols, such as IP, provide for addressing, error detection and correction, message ordering, and other network functions. These network functions are typically provided in a network layer, which operates between higher layers such as an application layer, and lower layers, for example, a physical layer. Thus the application layer may communicate with remote applications through the network layer without tending to details of how error-free communication is achieved. The network layer, in turn, can provide network functionality without tending to the details associated with a physical link, such as modulation schemes.

The existence of known network protocols simplifies the design of ad hoc networks by providing well known techniques for implementing standardized network layer functionality and interfaces. An additional network layer is typically provided in ad hoc networks to manage link changes and network volatility. However, as a significant disadvantage, these network protocols are insensitive to issues of energy conservation, a design constraint of some importance in mobile networking environments where mobile stations generally operate from a battery with limited energy capacity.

There remains a need for a network protocol that improves energy efficiency in a mobile network.

SUMMARY OF THE INVENTION

According to the principles of the invention, there is provided a system, apparatus, and method for conserving energy in a mobile station of an ad hoc wireless data network. Information concerning motion of the mobile station is obtained, and a rate of motion is used to adjust network parameters such as a beaconing rate and a sensitivity to link quality changes. These parameters may be adjusted to reduce network overhead transmissions, and the power usage associated therewith, at appropriate times. In one embodiment, network-related transmissions, such as beacon signals and link state announcements, are reduced when the mobile station is moving quickly.

A method for conserving energy in a mobile station of a wireless ad hoc network is described, including determining a motion rate of the mobile station, and adjusting one or more network parameters of the mobile station in response to a change in the motion rate. In one embodiment, each of the one or more network parameters is associated with an amount of network overhead traffic originating from the mobile station.

A computer program product for conserving energy in a mobile station of a wireless ad hoc network is also provided, including computer executable code that determines a motion rate of the mobile station, and computer executable code that adjusts one or more network parameters of the mobile station in response to a change in the motion rate. In one embodiment, each of the one or more network parameters is associated with an amount of network overhead traffic originating from the mobile station.

In another aspect, a mobile station for use in an energy conserving wireless ad hoc network is described, including a motion data source, the motion data source providing a motion data signal describing motion of the mobile station, and a network control, the network control managing a connection to an ad hoc wireless data network. The network control receives the motion data signal and uses the motion data signal to determine one or more network parameters. In one embodiment, each of the one or more network parameters is associated with an amount of network overhead traffic originating from the mobile station.

In another aspect, a network control for conserving energy in a mobile station of a wireless ad hoc network is described. The network control manages a connection to an ad hoc wireless data network. The network control receives a motion data signal relating to the motion of the mobile station and the network control using the motion data signal to determine one or more network parameters. In one embodiment, each of the one or more network parameters is associated with an amount of network overhead traffic originating from the mobile station.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including an energy-conserving network protocol for use with an ad hoc network of mobile stations. However, it will be understood by those of ordinary skill in the art that the methods and systems described herein can be suitably adapted to any system of ad hoc, networked, mobile units. The principles of the invention are particularly applicable to those environments where movement information, or some proxy for movement information such as communication link quality, is available to the network protocol.

Figure 1:
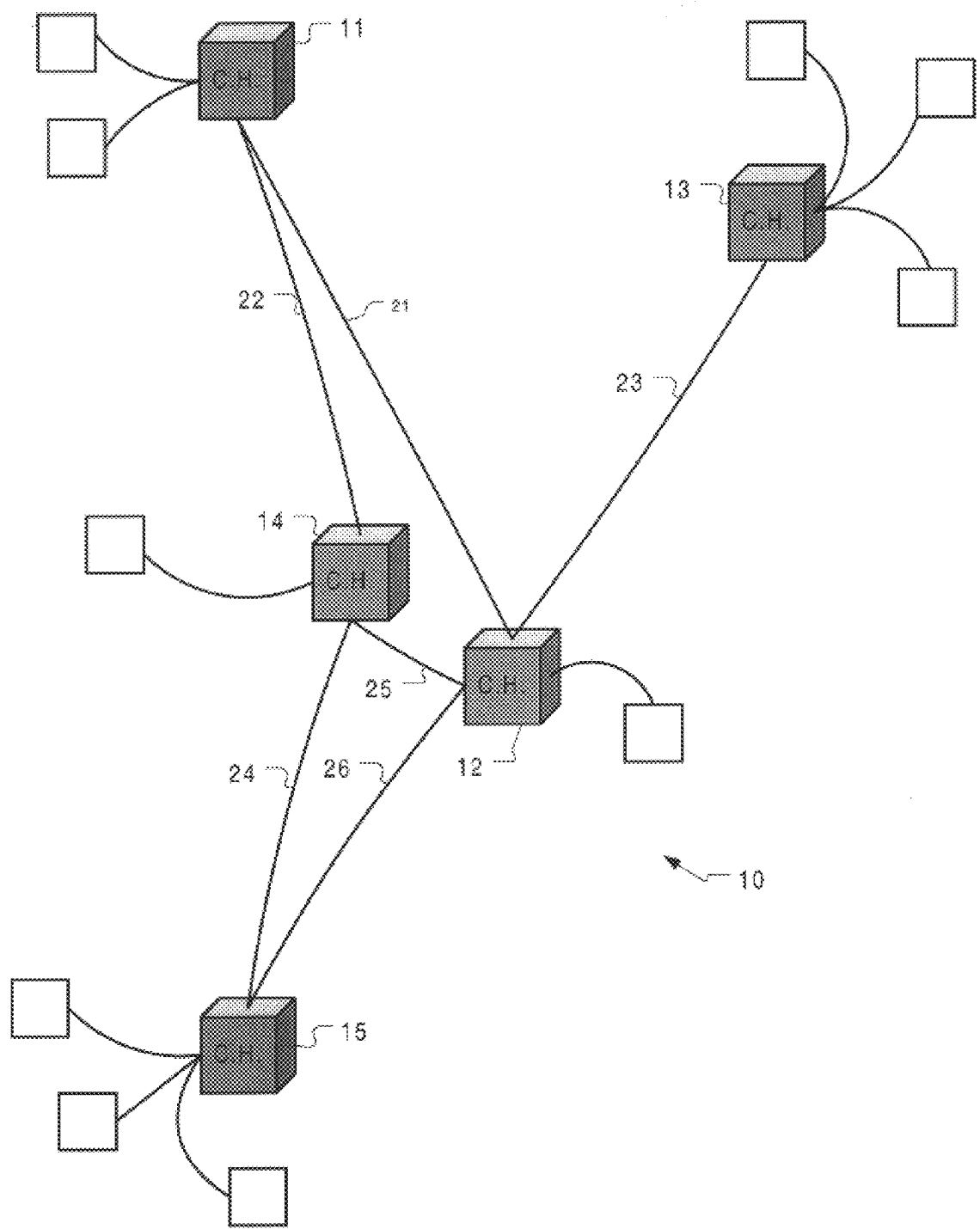
FIG. 1 shows a communications network that may be used with the present invention.

FIG. 1 shows a communications network 10 that may be used with the present invention. The communications network employs a plurality of similar mobile stations, some of which may operate as cluster gateway stations. The cluster gateway stations are indicated by squares labeled "C.H." (for "cluster heads") and are designated by reference characters 11–15, whereas the non-gateway stations are indicated by smaller squares that are not identified by individual reference characters. Established channels or data communications links connecting various of the cluster gateways are designated by reference characters 21–26. Links connecting non-gateway stations to gateway stations are shown by similar lines, but without identification by individual reference characters.

While FIG. 1 illustrates a particular interconnection of the various stations shown, it should be understood that this configuration of connections is not predetermined and that other patterns of connections might arise in accordance with the present invention. Further, the pattern of connections can change during operation, for example to accommodate the introduction of new stations, to allow for the withdrawal or movement of one of the attached stations, or to adjust to changes in link quality due to interference, moving obstructions, or the like. The mode of operation of each station is controlled by an embedded microprocessor, microcontroller, or other programmable device as is known in the art, and the method of operation described herein is intended to be implemented by the programming of the programmable device in accordance with the teaching herein.

An ad hoc, or self-forming network consistent with the above description is described, for example, in U.S. Pat. No. 5,850,592, entitled "Method for Self-Organizing Mobile Wireless Station Network."

Figure 2:
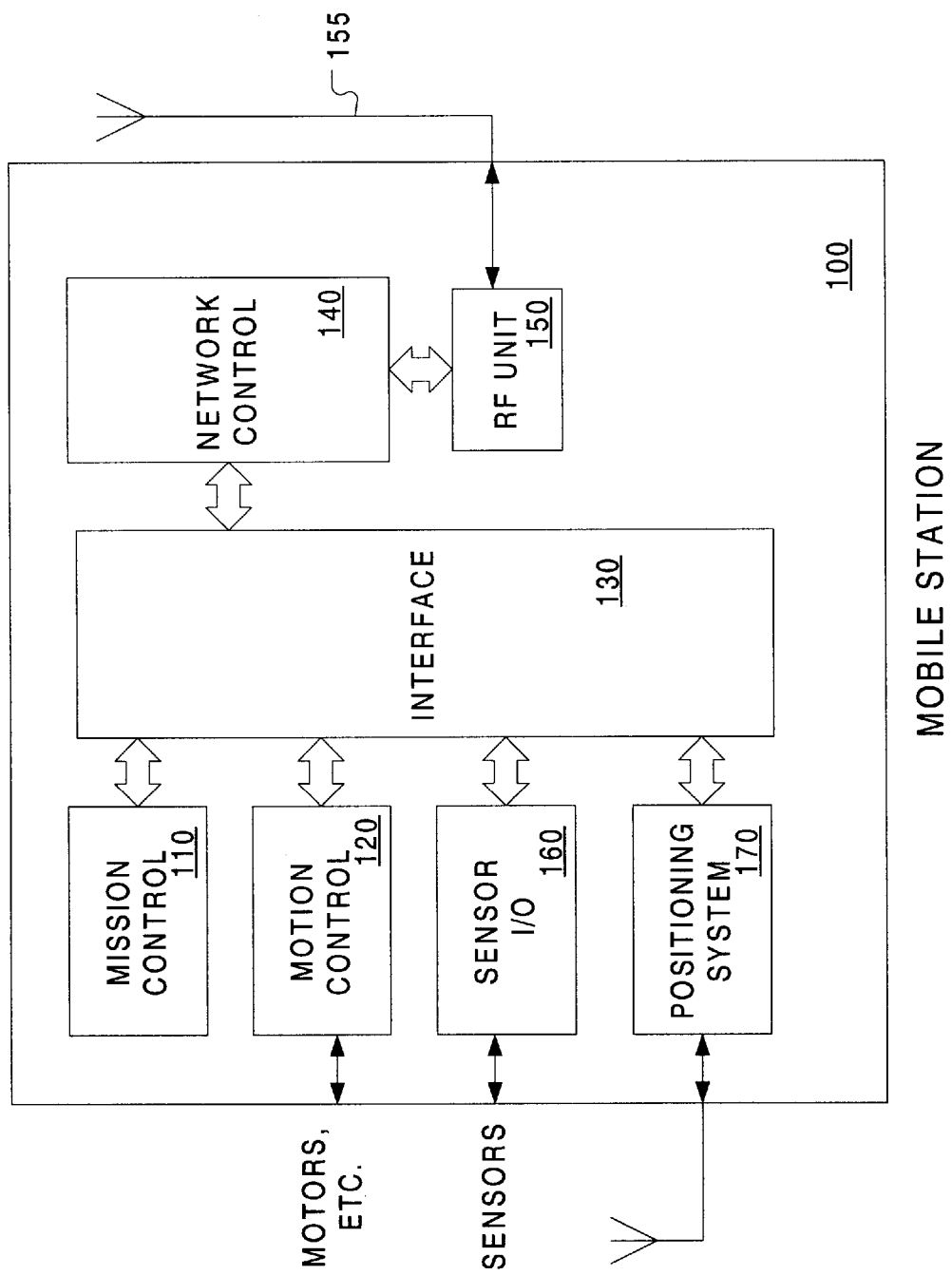
FIG. 2 shows a block diagram of a mobile station for use in a communications network according to the principles of the present invention.

FIG. 2 shows a block diagram of a mobile station for use in a communications network according to the principles of the present invention. A mobile station 100 includes a mission control 110, a motion control 120, an interface 130, a network control 140, and a radio frequency ("RF") unit 150. The mobile station 100 may optionally include additional components, such as a sensor input/output ("I/O") 160 for interfacing with video, audio, or other transducers and/or robotic components such as mechanical arms, video direction control, and the like. The mobile station may also include a positioning system 170 such as a Global Positioning System ("GPS") unit.

It will be appreciated that a number of techniques are known for implementing the components mentioned above. All of the functions, except for analog/digital and digital/analog conversion of radio signals, motor signals, and any sensor input/output, may be accomplished with software executing on a microprocessor in a computer, or on a microcontroller or programmable digital signal processor in an embedded system. The system may be integrated in its entirety into an application-specific integrated circuit, programmable gate array, programmable logic device, or other system-on-a-chip design. Additionally, a number of radio frequency chips and chip sets are commercially available that are pre-configured to use known modulation schemes. Any of these devices may be adapted to operate according to the teachings of the invention.

It will be further appreciated that, although not shown, the mobile station 100 and the components thereof will typically be powered by a battery having a limited energy capacity.

In one embodiment, the mission control 110 directs actions of the mobile station 100 according to a predetermined mission. The mission control 110 generates motion signals to the motion control 120, where the motion signals are converted into activating signals for motors or other control devices for moving the mobile station 100. The mission control 110 may implement arbitrary mission algorithms which may relate exclusively to a solitary mobile station 100, or which may be carried out in conjunction with other mobile stations that share data and mission information through a data link maintained by the network control 140. The mission control 110 may operate in response to specific commands from other mobile stations, or may generate commands to other mobile stations. The mission control 110 may also communicate with other components of the mobile station through the interface 130.

The motion control 120 receives motion command signals, through the interface 130, from the mission control 110. The motion control 120 converts the motion command signals into a form suitable to the motion devices, e.g. motors, servos, etc. used to move the mobile station 100. This may include, for example, digital-to-analog conversion and power amplification. The motion control 120 also provides motion feedback to the mission control 110.

The interface 130 controls communication between the other components of the mobile station. In one embodiment, the interface 130 may be a physical bus structure connecting individual components of the mobile station 100. In another embodiment, the interface 130 may be a software interface, such as an application protocol interface, connecting individual software modules of the mobile station. The interface 130 may also be some combination of these.

In accordance with one embodiment, the network control 140 manages connections to other data sources in the ad hoc wireless network, and performs functions that maintain the network and adapt the network to changing conditions. In addition to conventional network functions, such as buffering input and output between a radio frequency ("RF") unit 150 and the interface 130, the network control 140 can perform several functions specific to an ad hoc wireless network that are described in more detail below. The RF unit 150 may use any modulation scheme known for wireless communication and suitable to the application of the mobile station 100. This may include any digital radio frequency scheme known in the art including quadrature-amplitude modulation, binary phase shift keying, quadrature phase shift keying, or the like. The modulated RF signal may be transmitted over an antenna 155, and signals received by the antenna 155 may likewise be demodulated into a digital form suitable for the network control 140. It will be appreciated that, although shown as a radio frequency communication link, the communication link used by the mobile station 100 may be optical, infrared, acoustic, or any other type of link capable of supporting bi-directional data communications.

The mobile station 100 may include additional components such as a sensor input/output 160 and a positioning system 170. The sensor input/output 160 may control any input or output devices associated with the mobile station 100, such as optical transducers, robotic arms, gears, and the like. These devices operate under control of the mission control 110. The positioning system 170 may be any known positioning system, such as radio direction finding, Loran, Global Positioning System, or the like, capable of resolving movement of the mobile station 100 and communicating position and/or movement information to the other mobile station components.

Figure 3:
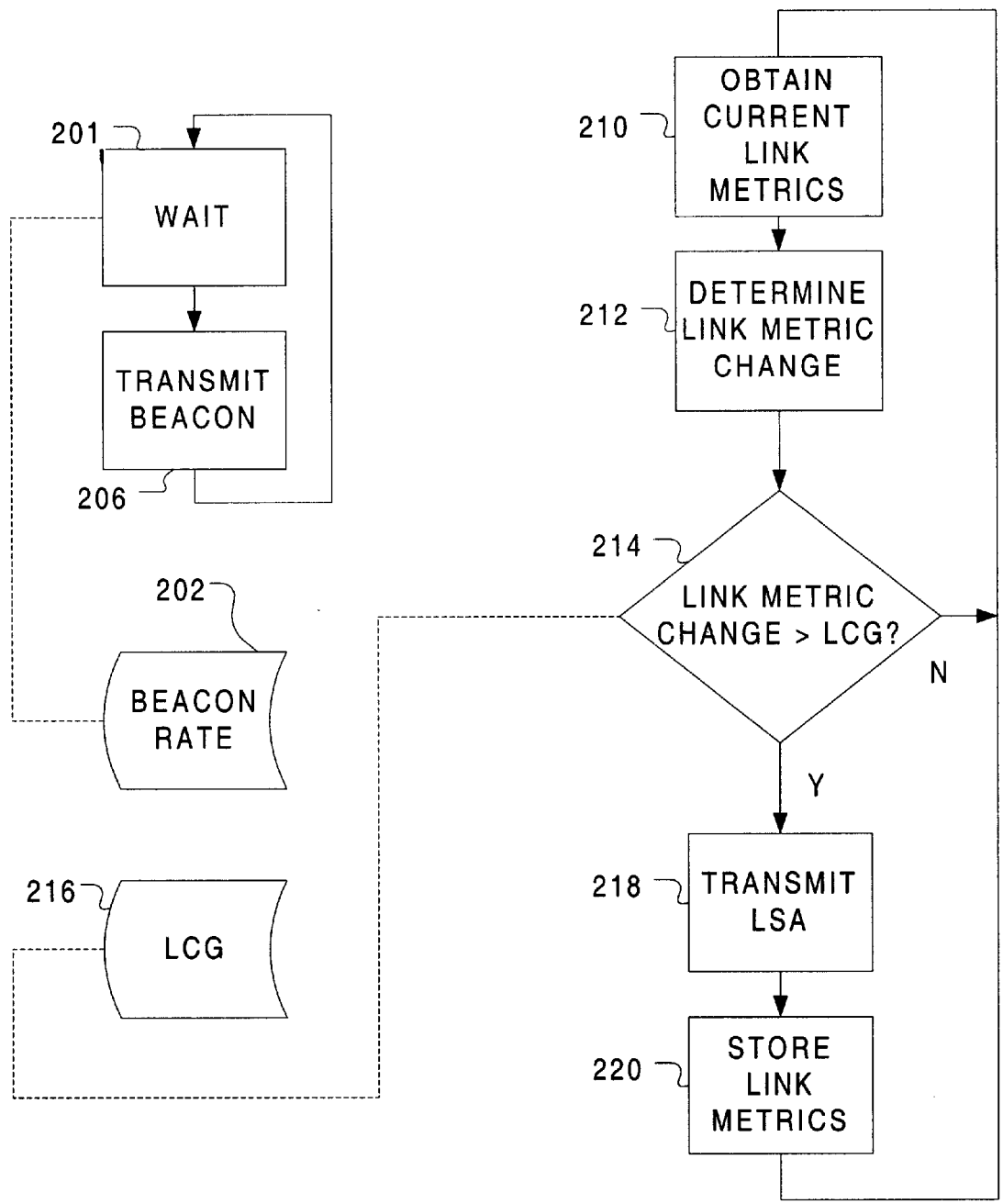
FIG. 3 is a flow chart showing beaconing and link state announcements by the network control of FIG. 2.

FIG. 3 is a flow chart showing beaconing and link state announcements by the network control of FIG. 2. Beaconing is performed by the network control 140 of the mobile station 100 in order to periodically announce the presence of the mobile station 100 to the communications network 10, or to announce the presence of the mobile station 100 to other networks or mobile stations that are not currently in the communications network 10. As used herein, terms such as "beacon", "beaconing rate", and the like, are specifically intended to refer to beaconing, neighbor discovery, or any other techniques to assist in creating communication links in an ad hoc network as may be generally known in the art. A beaconing process begins with step 201, where the network control 140 waits an amount of time determined by a beacon rate 202. The beacon rate 202 is a network parameter stored in a volatile or non-volatile memory associated with the network control 140. It will be appreciated that the beacon rate 202 may be stored as a physical quantity, such as $s^{-1}$, or may be stored in other units provided they are consistent with the wait calculation performed in step 201. When the beaconing process has waited an amount determined by the beacon rate 202, the process continues to step 206 where a beacon is transmitted. In this step the network control 140 generates a message that is forward to the RF unit 150 for transmission over the communications network 10. The beacon includes an identifier for the mobile station 100 so that beacons from different stations can be distinguished from one another.

Link state announcements, on the other hand, may be generated by the network control 140 of the mobile station 100 and broadcast over the communications network 10 in order to facilitate path creation and maintenance among stations in the communications network 10. The link state announcement includes information relating to paths selected by the network control 140, as well as other stations known to the network control 140 and the quality of communication links to these known stations. Link state announcements are broadcast periodically, according to changes in communication links and paths in the communications network 10.

A link state announcement process begins by obtaining one or more current link metrics, as shown in step 210. Each established communication link to another mobile station in the communications network 10 is known as a "link state", and includes information stored in a memory associated with the network control 140 concerning quality of the link, paths through the link, etc. The link quality is determined by one or more link state metrics, which may be determined by any conventional technique for measuring the signal quality of the link. Such techniques may including signal processing techniques such as calculating a signal-to-noise ratio, measuring a signal strength, or using a predictive filter with error estimation. It may also include data networking techniques such as measuring a peak data rate or calculating a proportion of dropped packets. In one embodiment, the link metrics are converted to a single value indicative of signal quality. Representing a number of link metrics as a single value permits comparison of the number of link metrics with a single network parameter for link quality, as described below.

In step 212, a change in the link metric is determined. A current link metric is compared with a previous link metric stored in a memory associated with the network control 140 (as shown in step 220 below) to obtain a value for a link metric change.

In step 214, the link metric change is compared to a link change granularity 216 stored in a memory associated with the network control 140 of the mobile station 100. The link change granularity 216 is a network parameter that establishes the coarseness with which the network control 140 responds to changes in link metrics by transmitting new link state announcements. The link change granularity 216 may be stored as a value having any units, provided they are consistent with the link metrics used in steps 210–212. As shown in FIG. 3, if the link metric change is not greater than the link change granularity 216, then the process returns to step 210 where current link metrics may again be obtained.

If the link metric change is greater than the link change granularity 216, then the link state announcement process proceeds to step 218. In this step, the network control 140 broadcasts a link state announcement containing the new link quality information and any new communication path information generated by the network control 140. In step 220, the current link metrics are stored so that they may be used as a 'previous' link metric value in future iterations of the link state announcement process. The process then returns to step 210 where new link metrics are obtained. It will be appreciated that, while the above steps describe a limit method technique for monitoring link changes, other techniques may also be used, such as a predictive filter using error estimation.

Figure 4:
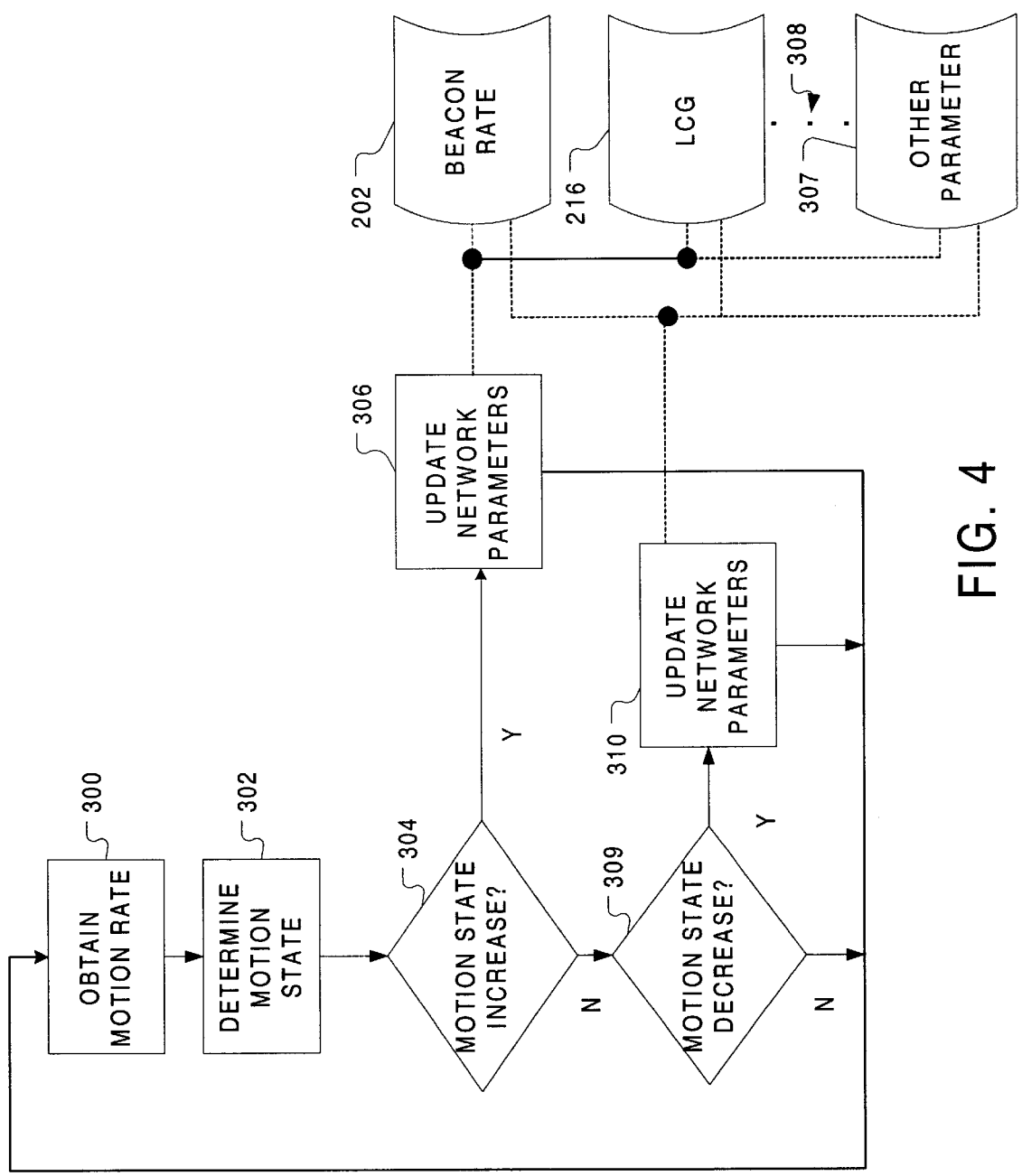
FIG. 4 is a flow chart showing adjustments to network parameters in a communication network.

FIG. 4 is a flow chart showing adjustments to network parameters in a communication network. In step 300, motion rate information is obtained. It will be appreciated that the motion rate information may be values representative of a motion rate. The motion rate information obtained in step 300 may instead be values representative of several positions, coupled with a time between position measurements, which may be converted to a motion rate in step 300. The motion rate may be obtained from motion feedback provided by the motion control 120, or from the positioning system 170. The motion rate may also be determined from information obtained from the sensor I/O 160, or from some other source, provided it can be supplied to the network control 140 in a suitable format for the network control 140.

In one embodiment, the motion rate may be an expected motion rate. The expected motion rate is based upon information provided directly from the mission control 110 to the network control 140. In this manner, the network control 140 may adjust network parameters in response to an impending change in motion rate before the mission control 110 has provided any new motion rate data to the motion control 130.

After the motion rate has been obtained, the process proceeds to step 302 where a motion state is determined. The motion state is a value characterizing the motion rate. In one embodiment, the motion state has two possible values: fast or slow. A slow value indicates that the mobile station 100 is either not moving, or moving at less than a predetermined rate. The fast value indicates that the mobile station 100 is moving as fast as or faster than a predetermined rate. Other motion states are possible, and may include several more intermediate states, as well as a stopped state. Furthermore, it will be appreciated that the motion rate may be represented as a continuous variable that is related to network parameters in the following steps by one or more closed-form mathematical expressions.

In step 304, the motion state is examined to determine if there has been an increase therein. In the two-state embodiment described above, a motion state increase is signified by a change in the motion state from slow to fast. If there is an increase in the motion state, then the process proceeds to step 306.

In step 306, network parameters are adjusted according to an increase in the motion state. For example, it may be expected that a fast-moving mobile station 100 will not effectively form new communication links. As such, it may be desirable to decrease the beacon rate 202, thus reducing the number of beacon broadcasts by the network control 140 of the mobile station 100. The reduced beacon rate 202 may be stored in the memory associated with the network control 140, and used by the network control 140 when determining the amount of time to wait in step 201 of FIG. 3.

Similarly, where it is expected that a fast-moving mobile station 100 will generate many changes in communication links, it may be desirable to increase the link change granularity 216. Increasing the link change granularity 216 will reduce the frequency with which the link state announcement process transmits link state announcements to the communications network 10 (step 218, FIG. 3).

A number of other network parameters 307 relating to network overhead may similarly be adjusted in response to a change in the motion state, as indicated by an ellipsis 308. For example, the network control 140 may reduce a degree of error correction used for outgoing transmissions, or may restrict the mobile station 100 to a non-gateway role in the communications network 10. Once the network parameters have been updated in step 306, the process returns to step 300 and a new motion rate is obtained.

If it is determined, in step 304, that the motion state has not increased, then the process proceeds to step 309 where it is determined whether the motion state has decreased. In the two-state embodiment described above, a motion state decrease may signify that the motion state had changed from fast to slow. If the motion state has changed from fast to slow, then the process proceeds to step 310.

In step 310, network parameters are updated to reflect the change in motion state. Following the above example, it may be expected that a slow-moving mobile station 100 will more effectively form new communication links. As such, it may be desirable to increase the beacon rate 202, thus increasing the number of beacon broadcasts by the network control 140 of the mobile station 100. Or it may be desirable to increase the beacon rate 202 for a predetermined time after a change to a slow motion state, where it may be assumed that many new links may be formed as a mobile station 100 reduces speed. After this predetermined time, the network control 140 may again decrease the beacon rate 202, although no change in motion state has occured. The increased beacon rate 202 is stored in the memory associated with the network control 140, and used by the network control 140 when determining the amount of time to wait in step 201 of FIG. 3.

Similarly, where it is expected that a slow-moving mobile station 100 will more effectively form new communication links, it may be desirable to decrease the link change granularity 216. Decreasing the link change granularity 216 will increase the frequency with which the link state announcement process transmits link state announcements to the communications network 10 (step 218, FIG. 3). Through increased beaconing and increased link state announcements, the network control 140 can quickly adapt to changes in the surrounding communications network 10. When the network parameters have been updated to reflect the reduced motion state in step 310, the system proceeds to step 300 where new motion rate data is obtained.

If it is determined in step 309 that the motion state has not decreased, then the process proceeds to step 300, where new motion rate data is obtained.

It will be appreciated that variations to the above-described system are possible. For example, a zero-motion state may be provided for non-moving mobile stations. This state might be associated, for example, with a higher link change granularity, resulting in less link state announcements. The motion state may also be adapted to the mobile station's role in the network, depending, for example, on whether the mobile station is a gateway or a non-gateway. Further, the motion states may be replaced by a continuous motion rate value, and updates to network parameters may be performed according to a continuous, closed-form mathematical expression that reduces energy usage by the mobile station 100.

While the invention has been disclosed in connection with the preferred embodiments shown and described in detail, various modifications and improvements thereon will become readily apparent to those skilled in the art. It should be understood that all matter contained in the above description or shown in the accompanying drawings shall be interpreted as illustrative and not in a limiting sense.

What is claimed is:

1. A method for conserving energy in a mobile station of a wireless ad hoc network comprising:

determining a motion rate of the mobile station; and adjusting one or more network parameters of the mobile station in response to a change in the motion rate, each of the one or more network parameters being associated with an amount of network overhead traffic originating from the mobile station, wherein the amount of network overhead traffic is reduced when the motion rate of the mobile station increases to at least a predetermined value.

2. The method of claim 1 wherein determining a motion rate comprises receiving periodic positioning data from a global positioning system and calculating the motion rate using the periodic positioning data.

3. The method of claim 1 wherein determining a motion rate comprises receiving motion data from a motion control, the motion data being used to control movement of the mobile station, and calculating the motion rate using the motion data.

4. The method of claim 1 wherein the motion rate comprises a motion state, the motion state being one of slow or fast.

5. The method of claim 1 wherein determining the motion rate comprises receiving motion data from a mission control, the motion data indicative of impending motion control signals for a motion control.

6. The method of claim 1, wherein one of the network parameters corresponds to a degree of error correction associated with data transmitted from the mobile station and the adjusting includes:

reducing a degree of error correction for outgoing transmissions when the motion rate of the mobile station increases to at least a predetermined value.

7. The method of claim 1, wherein one of the network parameters represents whether the mobile station can function as a gateway in the wireless ad hoc network and the adjusting includes:

configuring the mobile station to function as a non-gateway in the ad hoc wireless network when the motion rate of the mobile station increases to at least a predetermined value.

8. A method for conserving energy in a mobile station of a wireless network comprising:

determining a motion rate of the mobile station; and adjusting a beacon rate of the mobile station in response to a change in the motion rate, the beacon rate determining a rate at which the mobile station broadcasts a beacon and wherein the beacon rate is decreased in response to a predetermined increase in the motion rate and the beacon rate is increased in response to a predetermined decrease in the motion rate.

9. A method for conserving energy in a mobile station of a wireless network comprising:

determining a motion rate of the mobile station; and adjusting a link change parameter of the mobile station in response to a change in the motion rate, wherein the mobile station transmits a link state announcement when a change in the link quality exceeds the link change parameter and wherein the link change parameter is increased in response to a predetermined increase in the motion rate and the link change parameter is decreased in response to a predetermined decrease in the motion rate.

10. A computer program product for conserving energy in a mobile station of a wireless ad hoc network comprising:

computer executable code that determines a motion rate of the mobile station; and computer executable code that adjusts one or more network parameters of the mobile station in response to a change in the motion rate, each of the one or more network parameters being associated with an amount of network overhead traffic originating from the mobile station, wherein the amount of network overhead traffic is reduced when the motion rate of the mobile station increases to at least a predetermined value.

11. The computer program product of claim 10 wherein the computer executable code that determines a motion rate comprises computer executable code that receives periodic positioning data from a global positioning system and computer executable code that calculates the motion rate using the periodic positioning data.

12. The computer program product of claim 10 wherein the computer executable code that determines a motion rate comprises computer executable code that receives motion data from a motion control, the motion data being used to control movement of the mobile station, and computer executable code that calculates the motion rate using the motion data.

13. The computer program product of claim 10 wherein the computer ececutable code that determines the motion rate comprises computer executable code that receives motion data from a mission control, the motion data indicative of impending motion control signal for a motion control.

14. A computer program product for conserving energy in a mobile station of a wireless network comprising:

computer executable code that determines a motion rate of the mobile station; and computer executable code that adjusts a beacon rate in response to a change in the motion rate, the beacon rate determining a rate at which the mobile station broadcasts a beacon and wherein the beacon rate is decreased in response to a predetermined increase in the motion rate and the beacon rate is increased in response to a predetermined decrease in the motion rate.

15. A computer program product for conserving energy in a mobile station of a wireless network comprising:

computer executable code that determines a motion rate of the mobile station; and computer executable code that adjusts a link change granularity of the mobile station in response to a change in the motion rate, wherein the mobile station transmits a link state announcement when a change in the link quality exceeds the link change granularity and wherein the link change granularity is increased in response to a predetermined increase in the motion rate and the link change granularity is decreased in response to a predetermined decrease in the motion rate.

16. The computer program product of claim 15 wherein the motion rate comprises a motion state, the motion state being one of slow or fast.

17. A system for conserving energy in a mobile station of a wireless ad hoc network comprising:

determining means for determining a motion rate of the mobile station; and adjusting means for adjusting one or more network parameters of the mobile station in response to a change in the motion rate detected by the motion rate determining means, each of the one or more network parameters being associated with an amount of network overhead traffic originating from the mobile station, wherein the amount of network overhead traffic is reduced when the motion rate of the mobile station increases to at least a predetermined value.

18. A mobile station for use in an energy conserving wireless ad hoc network, the mobile station comprising:

a motion data source, the motion data source providing a motion data signal relating to change in motion rate of the mobile station; and a network control, the network control managing a connection to an ad hoc wireless data network, the network control receiving the motion data signal and using the motion data signal to determine one or more network parameters, each of the one or more network parameters being associated with an amount of network overhead traffic originating from the mobile station, wherein the amount of network overhead traffic is reduced when the motion rate of the mobile station increases to at least a predetermined value.

19. A network control for conserving energy in a mobile station of a wireless ad hoc network, the network control managing a connection to an ad hoc wireless data network, the network control receiving a motion data signal relating to change in motion rate of the mobile station and the network control using the motion data signal to determine one or more network parameters, each of the one or more network parameters being associated with an amount of network overhead traffic originating from the mobile station, wherein the amount of network overhead traffic is reduced when the motion rate of the mobile station increases to at least a predetermined value.

20. The network control of claim 19 wherein one of the one or more network parameters is a beacon rate.

21. The network control of claim 19 wherein one of the one or more network parameters is a link change granularity.

* * * * *